United States Patent
Baude et al.

(10) Patent No.: US 7,993,099 B2
(45) Date of Patent: Aug. 9, 2011

(54) HELICOPTER GAS TURBINE ENGINE WITH SOUND LEVEL LOWERED BY EJECTOR HUSH KITTING

(75) Inventors: Pierre Michel Baude, Nay (FR); Didier Jacques Andre Jouanchicot, Lescar (FR)

(73) Assignee: Turbomeca, Bordes (FR)

( * ) Notice: Subject to any disclaimer, the term of this patent is extended or adjusted under 35 U.S.C. 154(b) by 999 days.

(21) Appl. No.: 11/854,907

(22) Filed: Sep. 13, 2007

(65) Prior Publication Data

US 2008/0185216 A1    Aug. 7, 2008

(30) Foreign Application Priority Data

Sep. 20, 2006  (FR) ...................................... 06 53834

(51) Int. Cl.
*F01D 25/00* (2006.01)
(52) U.S. Cl. .................. 415/119; 415/211.2; 415/124.1
(58) Field of Classification Search .................. 415/119, 415/116, 211.2, 220, 124.1; 181/213, 215, 181/222; 244/1 N
See application file for complete search history.

(56) References Cited

U.S. PATENT DOCUMENTS

| | | | | |
|---|---|---|---|---|
| 4,001,473 A | * | 1/1977 | Cook | 428/116 |
| 4,433,751 A | * | 2/1984 | Bonneau | 181/213 |
| 5,127,602 A | * | 7/1992 | Batey et al. | 244/1 N |
| 5,157,916 A | * | 10/1992 | Wynosky et al. | 60/204 |
| 5,592,813 A | * | 1/1997 | Webb | 60/226.2 |
| 5,947,412 A | * | 9/1999 | Berman | 244/1 N |

FOREIGN PATENT DOCUMENTS

| | | |
|---|---|---|
| EP | 1 010 884 A1 | 6/2000 |
| FR | 2 873 167 | 1/2006 |
| GB | 865 838 | 4/1961 |
| GB | 2 044 359 A | 10/1980 |

OTHER PUBLICATIONS

U.S. Appl. No. 11/854,915, filed Sep. 13, 2007, Baude.

* cited by examiner

*Primary Examiner* — Ninh H Nguyen

(74) *Attorney, Agent, or Firm* — Oblon, Spivak, McClelland, Maier & Neustadt, L.L.P.

(57) ABSTRACT

A helicopter gas turbine engine having a combustion chamber, at least one turbine arranged downstream from the combustion chamber to receive combustion gases emitted by the latter and a nozzle is disclosed. The nozzle has one part forming a diffuser, connected downstream from the turbine and an ejector which has an upstream part surrounding the downstream end of the diffuser and defining therewith an outlet passage for an engine compartment cooling air secondary flow, the ejector running in the downstream direction beyond the downstream end of the diffuser. The ejector has a wall formed at least partially by a sound attenuator calculated to attenuate sound frequencies generated by the rotation of the or each turbine and/or by the combustion chamber.

7 Claims, 2 Drawing Sheets

HELICOPTER GAS TURBINE ENGINE WITH SOUND LEVEL LOWERED BY EJECTOR HUSH KITTING

BACKGROUND TO THE INVENTION

The invention relates to gas turbine helicopter engines.

As a result of the efforts made to reduce the noise generated by the rotation of helicopter rotor blades, the applicant found that the noise actually from gas turbine engines is becoming a significant component of the helicopters' overall sound level.

Therefore, an appreciable supplementary lowering of this sound level could be obtained by silencing the gas turbine engines themselves.

For that purpose, it is proposed in EP 1 010 884 to provide the walls of a multichannel nozzle receiving gas issuing from the turbine with a coating capable of absorbing sound energy. In view of the sound frequencies to be attenuated, the coating is relatively thick, which represents a substantial mass, all the more that the coating must be in a material capable of withstanding the temperature of the primary flow exiting from the turbine. In addition, the thickness of the coating cannot allow the gas flow issuing from the turbine to ensure an efficient aspiration of a possible secondary flow used for cooling the engine compartment through a passage surrounding the nozzle, whereby the acoustic treatment (hush kitting) of the nozzle is not compatible with an ejector function.

OBJECT AND SUMMARY OF THE INVENTION

The invention aims at avoiding such drawbacks and proposes therefor a helicopter gas turbine engine having a combustion chamber, at least one turbine arranged downstream from the combustion chamber to receive combustion gases emitted by the latter and a nozzle, the nozzle having a part forming a diffuser connected downstream from the turbine and an ejector which has an upstream part surrounding the downstream end of the diffuser and defining therewith an outlet passage for an engine compartment cooling air secondary flow, said ejector running in the downstream direction beyond the downstream end of the diffuser and having a wall formed at least partially by a sound attenuator calculated to attenuate sound frequencies generated by the or each turbine or by the combustion chamber.

In a helicopter gas turbine engine, the velocity of ejection of the gases exiting from the turbine is reduced as much as possible in order to optimize the conversion of the gases' energy to mechanical energy. The sound level at the nozzle outlet is therefore essentially due to the engine's rotating parts, in particular due to the or each turbine—which is the nearest rotating part—and due to the combustion chamber. Therefore, with the making of the ejector wall to form a sound attenuator effective in a range of sound frequencies generated by the rotation of the or each turbine and/or by the combustion chamber, an effective reduction of the noise can be achieved while benefit can be obtained from the secondary flow stream which protects the ejector wall from the hot gases coming from the turbine.

The sound attenuator can, therefore, be made of a light metal material, based on titanium for example, i.e. made of titanium or a titanium alloy, so that the presence of the attenuator is not penalizing in terms of mass. In addition, at the ejector, there is space available for making the sound attenuator in the form of, for example, a Helmholtz resonator several cm thick, calculated to attenuate frequencies of several hundred Hz to several kHz generated by the rotation of the or each turbine and by the combustion chamber, and this without affecting the ejector function.

It can be noted here that the problem of silencing at the outlet of a gas turbine for a helicopter engine is completely different from the problem of silencing at the outlet of a gas turbine for an aeroplane engine. Indeed, with an aeroplane gas turbine engine, the object is to produce thrust and therefore to eject a great mass of gas at high velocity. The noise generated is essentially a gas jet noise, against which a sound attenuator in the flow channel wall would have no effect.

BRIEF DESCRIPTION OF THE DRAWINGS

The invention will be understood better when the description given below, for guidance but without limitation, is read with reference to the appended drawings in which.

DETAILED DESCRIPTION OF EMBODIMENTS

Figure 1:
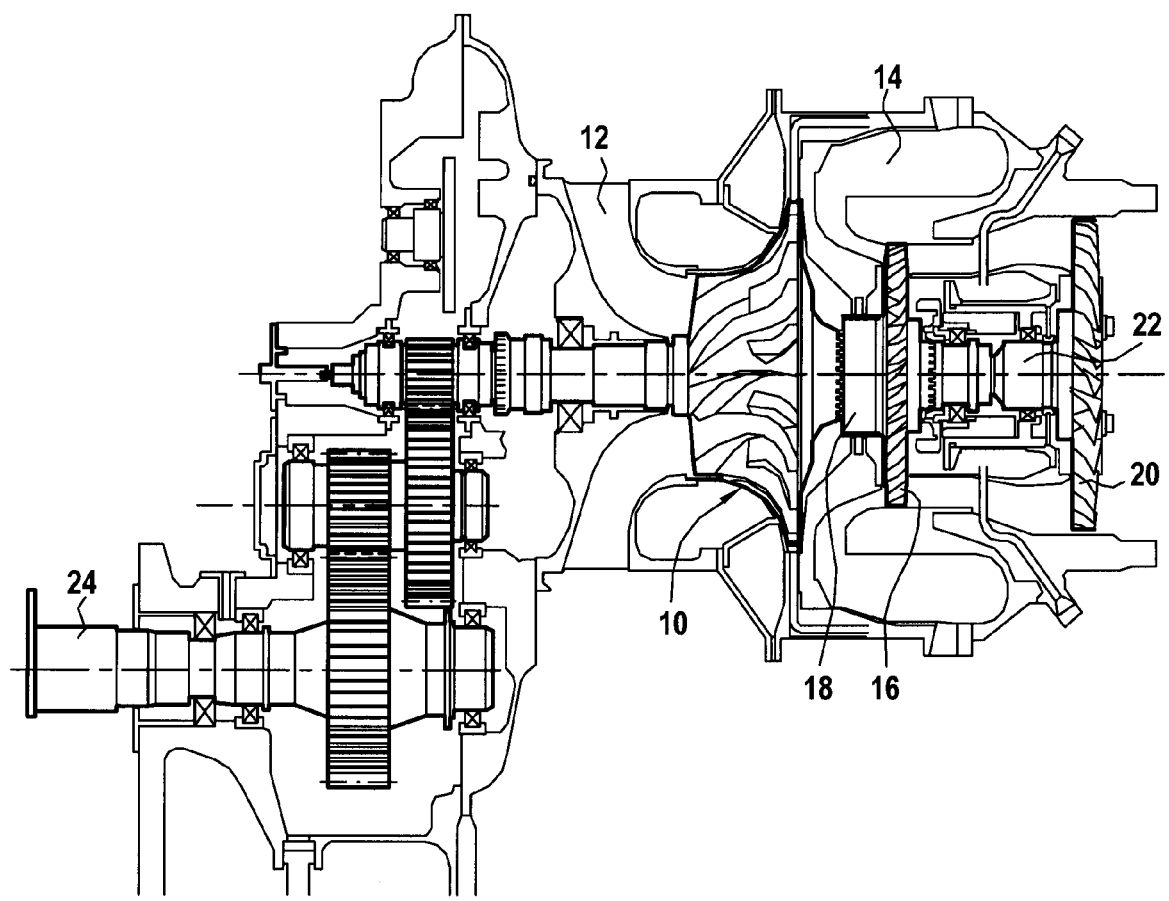
FIG. 1 is a schematic view of a helicopter gas turbine engine.

FIG. 1 schematically shows a helicopter gas turbine engine comprising a compressor stage 10 (a centrifugal compressor for example) receiving external air through an annular air inlet channel 12, an annular combustion chamber 14 (with, for example, a reverse flow system) fitted with injectors (not shown) supplied with fuel and with a primary air flow from the compressor, a turbine 16 for driving the compressor 10—connected to the latter by a shaft 18—and a power turbine 20 (with one single stage, for example) connected by a shaft 22 to a gear train supplying mechanical power to an output shaft 24, the shafts 18 and 22 being coaxial.

Figure 2:
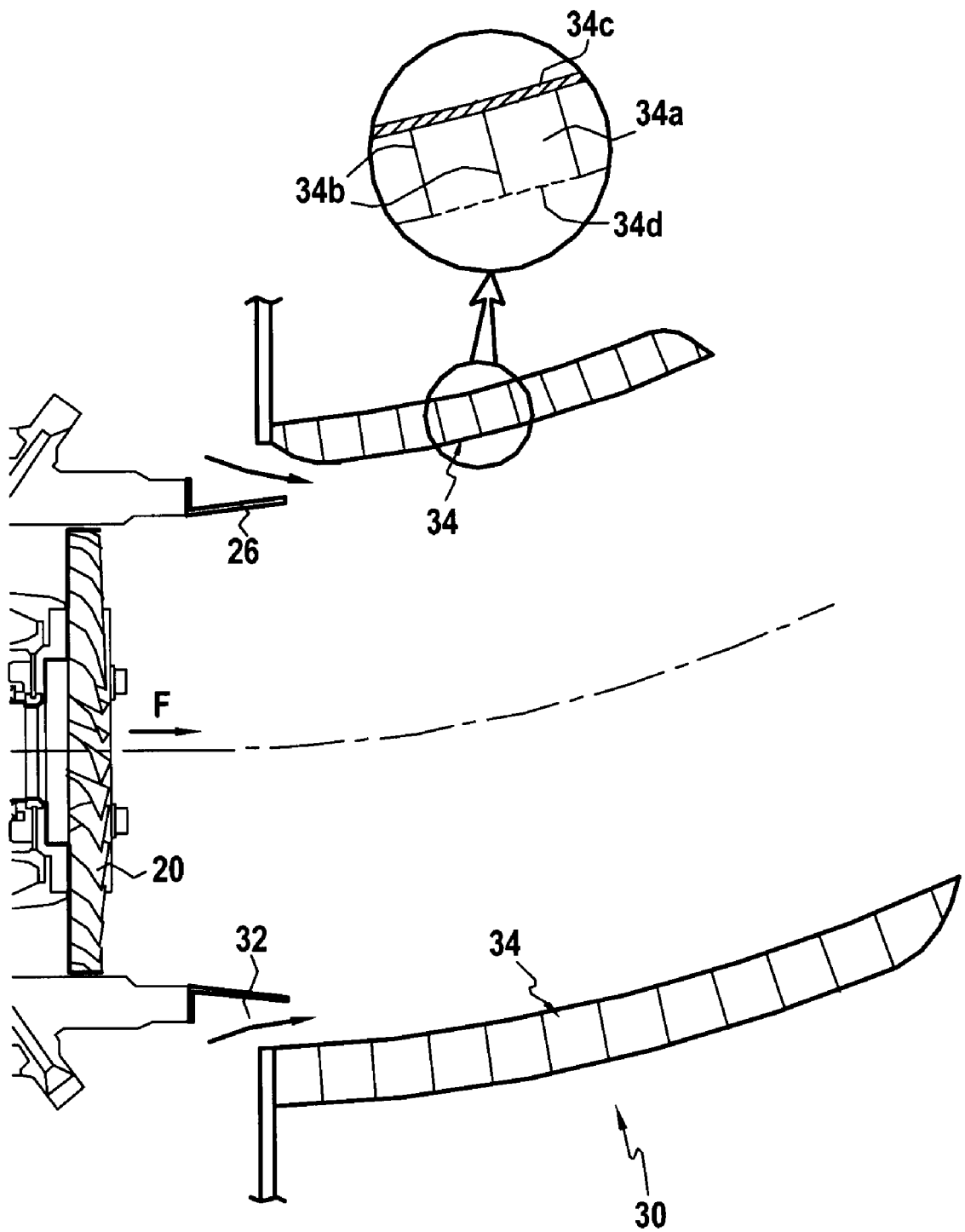
FIG. 2 is a partial view showing a helicopter engine diffuser-ejector assembly, according to an embodiment of the invention.

In the downstream direction, i.e. in the direction (arrow F) of flow of the gases coming from the combustion chamber, the power turbine 20 is extended by a nozzle which comprises a diffuser 26 and an ejector 30, as shown in FIG. 2.

The diffuser 26 receives the hot primary gaseous flow coming from the power turbine 20 and contributes, with the ejector 30, to slowing down this flow so that the energy of the gases flowing through the turbine 16, is, to the maximum extent, converted to mechanical energy transmitted to the output shaft. In a known manner, the ejector is bent at least at its downstream end to prevent the outgoing gaseous flow from being directed along the centre-line of the engine, towards the rear of the helicopter.

In its upstream end portion, the ejector 30 is fastened to the engine case (not shown) and surrounds the downstream end of the diffuser 26, providing, with the said end, an annular gap 32. A "cold" secondary air flow, used particularly to cool equipment situated in the engine compartment, passes around the combustion chamber, turbine 16, 20 and diffuser 26 assembly. The diffuser has a "straight" form, by contrast with a radially lobed or "petal" form used for promoting the mixing of the primary and secondary gas flows. Thus the secondary gas flow escapes through the gap 32, flowing along the internal face of the ejector 30. Extraction of the secondary gas flow is promoted by the effect of aspiration caused by the primary gas flow at the outlet of the diffuser.

On the internal side, the ejector has a wall formed by a sound attenuator 34 for at least part of the ejector's axial length. The attenuator 34 can be formed from several successive adjacent parts for greater convenience in manufacture.

As is shown by the detail in FIG. 2, the sound attenuator can be formed by a set of adjacent cavities or cells 34a, separated by walls 34b forming a honeycomb structure for example. The walls 34b run perpendicularly to the ejector surface between a back 34c formed by a sealed rigid plate or sheet (not crossed by sound waves) and a front face 34d formed by a plate or sheet allowing sound waves to go through. The front plate or sheet 34d is, for example, perforated. A porous plate or sheet permeable to the sound waves to be attenuated could also be used.

The depth of the cavities 34a (the distance between the back and the front face) is chosen depending on the wavelength of the sound waves to be attenuated. The latter, produced essentially by the turbines 16, 20 or the combustion chamber 14, have a frequency of several hundred Hz to several kHz, which involves a cavity depth (a quarter of the wavelength) of several centimeters.

Because the ejector, on the internal side, is swept by the "cold" secondary flow, the material forming the sound attenuator can be chosen from a fairly wide range of materials and thus particularly from light materials. An example of a material which can be used is titanium. Other metal or non-metal materials could, of course, be chosen.

In order to have the most effective attenuation possible, it is desirable that the attenuator runs along the ejector's entire length and that this length is given priority compared with the diffuser length. A ratio of at least 1:1 between the ejector length and the diffuser length could be chosen.

Although an attenuator structure of the type known under the name of a Helmholtz attenuator has been described above, other types of sound attenuators such as foam or ceramic or metal porous materials, for example, can be used.

The invention claimed is:

1. A helicopter gas turbine engine comprising:
   a compressor which receives external air through an air inlet channel;
   a combustion chamber;
   a first turbine arranged downstream from the combustion chamber which receives combustion gases emitted by the combustion chamber so as to drive the compressor through a first shaft;
   a second turbine arranged downstream from the first turbine which is connected by to a second shaft to a gear train so as to supply mechanical power to an output shaft, the first shaft and the second shaft being coaxial, and the second shaft and the output shaft are not coaxial; and
   a nozzle,
   wherein the nozzle includes a part forming a diffuser connected downstream from the second turbine and an ejector which has an upstream part surrounding the downstream end of the diffuser and defining therewith an outlet passage for an engine compartment cooling air secondary flow, and
   wherein said ejector extends in the downstream direction beyond the downstream end of the diffuser and includes a wall formed at least partially by a sound attenuator which attenuates sound frequencies generated by at least one of the rotation of at least one of the first or second turbines or by the combustion chamber, and a downstream end of said ejector is bent away from an axis of the engine.

2. The helicopter engine according to claim 1, wherein the sound attenuator is formed by a Helmholtz resonator structure.

3. The helicopter engine according to claim 1, wherein the sound attenuator is a structure made of a titanium based metal material.

4. The helicopter engine according to claim 1, wherein the ratio between the axial lengths of the ejector and of the diffuser is at least 1:1.

5. The helicopter engine according to claim 1, wherein the sound attenuator includes a set of adjacent cells separated by walls which extend between a back face and a front face.

6. The helicopter engine according to claim 5, wherein the front face of the sound attenuator is perforated.

7. The helicopter engine according to claim 5, wherein the sound attenuator presents a honeycomb structure.

\* \* \* \* \*